United States Patent [19]

Aoyama et al.

[11] Patent Number: 4,895,763
[45] Date of Patent: Jan. 23, 1990

[54] MAGNETIC RECORDING MEDIUM AND NON-AQUEOUS SUSPENSION OF INORGANIC SOLID PARTICLES FOR USE IN THE PRODUCTION OF THE SAME

[75] Inventors: Shigeo Aoyama, Kyoto; Kenji Sumiya, Suita; Yoshiharu Katsuta, Takatsuki, all of Japan

[73] Assignee: Hitachi Maxell, Ltd., Osaka, Japan

[21] Appl. No.: 114,847

[22] Filed: Oct. 30, 1987

[30] Foreign Application Priority Data

Oct. 31, 1986 [JP] Japan ................................ 61-261701
Oct. 31, 1986 [JP] Japan ................................ 61-261702
Oct. 31, 1986 [JP] Japan ................................ 61-261703

[51] Int. Cl.$^4$ .............................................. G11B 5/70
[52] U.S. Cl. .................................... 428/405; 428/694; 428/900
[58] Field of Search ..................... 428/405, 694, 900; 106/287.11, 287.3, 308 Q, 308 N; 523/213

[56] References Cited

U.S. PATENT DOCUMENTS

| 2,742,378 | 8/1956 | Te Grotenhaus | 523/213 |
| 3,957,683 | 5/1976 | Hittmair | 523/213 |
| 4,043,969 | 8/1977 | Sporck | 523/213 |
| 4,076,890 | 2/1978 | Yamada | 428/405 |
| 4,116,919 | 9/1978 | Elias | 523/213 |
| 4,475,946 | 10/1984 | Matsufuji | 428/405 |
| 4,578,314 | 3/1986 | Ohta | 428/405 |
| 4,590,127 | 5/1986 | Hashimoto | 428/405 |
| 4,686,247 | 8/1977 | Yosida | 523/213 |
| 4,740,423 | 4/1988 | Kadokura | 428/403 |
| 4,740,538 | 4/1988 | Sekutowski | 106/308 Q |

FOREIGN PATENT DOCUMENTS 202327 9/1987 Japan .................................. 428/694

Primary Examiner—Paul J. Thibodeau
Attorney, Agent, or Firm—Birch, Stewart, Kolasch & Birch

[57] ABSTRACT

When non-magnetic solid particles, the surface of which are treated with an organosilazane, are used in the formation of a magnetic recording medium, they are well dispersed in a binder resin, so that a magnetic layer comprising such solid particles has improved electromagnetic conversion characteristics, traveling stability and durability, and a back coat layer comprising such solid particles has improved abrasion resistance and surface evenness.

7 Claims, No Drawings

MAGNETIC RECORDING MEDIUM AND NON-AQUEOUS SUSPENSION OF INORGANIC SOLID PARTICLES FOR USE IN THE PRODUCTION OF THE SAME

BACKGROUND OF THE INVENTION

1. Field of the Invention

The present invention relates to a magnetic recording medium and to the use of a non-aqueous suspension of inorganic solid particles in the production of the same. More particularly, the present invention relates to a magnetic recording medium comprising a magnetic layer and/or a back coat layer in which inorganic solid particles are well dispersed so that electromagnetic conversion characteristics, traveling stability and durability of the magnetic layer and abrasion resistance and surface smoothness of the back coat layer are improved, and to a non-aqueous suspension of inorganic solid particles suitable for use in the formation of the magnetic layer and/or back coat layer of the magnetic recording medium.

2. Description of the Prior Art

A magnetic recording medium is generally produced by coating a magnetic paint comprising a magnetic powder, a binder resin, a solvent and other necessary additives on one or both surfaces of a substrate such as a polyester film and drying it to form a magnetic layer on the substrate.

The magnetic recording medium is required to have good electromagnetic conversion characteristics, traveling stability and durability. To improve the traveling stability and durability of the magnetic layer, it is proposed and practiced to add relatively hard non-magnetic solid particles, such as $Al_2O_3$ powder, and $TiO_2$ powder to the magnetic layer.

The magnetic recording medium to be used as a video tape has a back coat layer in order to prevent non-uniform winding during high speed winding and electrostatic charge and to improve traveling stability and durability of the medium. To prevent electrostatic charge and to improve the traveling stability and durability, the back coat layer is formed by coating a mixture of carbon black and suitable solid additive particles as well as a bider resin on the back surface of substrate.

Generally, the non-aqueous suspension of inorganic solid particles to be used for the formation of the magnetic layer or back coat layer comprises the non-magnetic particles, a non-aqueous solvent and a dispersant. In such a suspension, it is required for the inorganic solid particles to be divided to substantially their primary particles and to keep such a good dispersed state for a long time. However, since surfaces of most kinds of the inorganic solid particles are hydrophilic, it is very difficult to homogeneously and stably disperse the inorganic solid particles in the non-aqueous lipophilic solvent. Therefore, it is proposed to treat the surfaces of such inorganic solid particles with a suitable dispersant. For example, fatty acids, titanate type coupling agents and aluminum coupling agents are suggested as dispersants for treating the surfaces of inorganic solid particles (cf. Japanese Patent Kokai Publication Nos. 170026/1985 and 129927/1985).

When the surfaces of inorganic solid particles are treated with the dispersant, the dispersibility of the particles and stability of the dispersion are improved, but their improvement is still not satisfactory. If such a conventional dispersant is used for treating the inorganic solid particles, the treated solid particles still have an insufficient affinity with the binder resin component in the magnetic layer and less dispersibility in the magnetic layer, so that the traveling stability and durability of the magnetic recording medium are not desirably improved. In addition, the surface evenness of the magnetic layer is deteriorated and in turn the electromagnetic conversion characteristics are decreased. Further, in the case of the back coat layer, its surface evenness is deteriorated and abrasion resistance is insufficient. Therefore, the traveling property of the magnetic recording medium is not improved.

SUMMARY OF THE INVENTION

One object of the present invention is to provide a suspension of inorganic solid particles the surfaces of which are treated with a dispersant which improves the dispersibility of the particles and stability of the dispersion.

Another object of the present invention is to provide a magnetic recording medium comprising a magnetic layer in which non-magnetic particles are well dispersed to improve surface evenness and in the turn traveling property, durability and electromagnetic conversion characteristics of the recording medium.

A further object of the present invention is to provide a magnetic recording medium comprising a back coat layer in which non-magnetic particles are well dispersed to prevent electrostatic charge.

According to the present invention, surfaces of non-magnetic solid particles are treated with an organosilazane compound having alkyleneoxy units comprising a basic unit of the formula:

wherein R is a group of the formula:

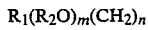

in which $R_1$ is alkoxy or acetoxy having 1 to 6 carbon atoms, $R_2$ is alkylene having 1 to 5 carbon atoms, m is an integer of 1 to 50, n is an integer of 0 to 5, and R' and R'' are the same or different, wherein each may be an alkyl having 1 to 6 carbon atoms or an amino.

DETAILED DESCRIPTION OF THE INVENTION

The $R_2O$ repeating units in the organosilazane (I) may comprise at least one kind of alkyleneoxy unit selected from the group consisting of ethyleneoxy unit, propyleneoxy unit and butyleneoxy unit. When the $R_2O$ repeating unit comprises two or more kinds of units, it may be a random or block polymer chain. When it is the block polymer chain, the units may be in any order. One of R' and R'' may be an alkyl group and the other may be an amino group.

Since the organosilazane compound having the alkyleneoxy units has high reactivity with the hydroxyl group on the surface of non-magnetic solid additive particle (e.g. carbon black, $Al_2O_3$, $TiO_2$, mullite, etc.), when it contacts with such an additive particle, the —NH— linkage and/or the —NH$_2$ linkage, which are formed in the polymerized organosilazane, tend to be broken to liberate NH$_3$, which forms a chemical bonding with the surface of the additive particle through the oxygen atom and fixes on the surface. However, since the organosilazane has no reactive group such as a free amino, vinyl or isocyanate group to react with the binder resin in the molecule, it does not thicken the magnetic paint even when the binder resin has a reactive group, such as a hydroxyl, carboxyl or isocyanate group.

By selecting the kind of alkyleneoxy units or their molar ratio, it is possible to impart good affinity with the binder resin and the organic solvent to the non-magnetic solid additive particles. Thereby, the dispersibility and dispersion stability of the non-magnetic solid additive particles are significantly improved, even when a non-aqueous solvent or an arbitrary binder resin is used or when the additive particle has a very small particle size.

The amount of the organosilazane having the alkyleneoxy unit is preferably from 0.1 to 20 parts by weight, more preferably from 1 to 10 parts by weight per 100 parts by weight of the non-magnetic solid additive particles. When the amount of the organosilazane is too small, the dispersibility of additive particles is not improved. When it is too large, the surface evenness of the magnetic layer is deteriorated, or durability is decreased.

To treat the non-magnetic solid additive particles with the organosilazane having the alkyleneoxy unit, the particles are mixed and dispersed in a solution of the organosilazane in a suitable solvent by means of a suitable mixer such as a homomixer, sand mill or ball mill. The treated additive particles are used in the form of a slurry as prepared, or subsequently filtered and dried to store in the form of powder which is added to the magnetic paint in a suitable step of the preparation of the paint.

Preferred examples of the solvent in which the organosilazane is dissolved are $C_3$-$C_8$ alcohols, ketones (e.g. acetone, methyl ethyl ketone, methyl isobutyl ketone and cyclohexanone), esters (e.g. ethyl acetate and butyl acetate), aromatic compounds (e.g. benzene and toluene), ethers (e.g. tetrahydrofuran and dioxane) and mixtures thereof. A concentration of the organosilazane in the solvent varies with the kind of solvent, and preferably from 0.1 to 5.0% by weight, more preferably from 0.5 to 2.0% by weight.

Specific examples of the non-magnetic solid additive particles are carbon black, metal oxides (e.g. $Al_2O_3$, $TiO_2$, $SiO_2$, ZnO, $\alpha$-$Fe_2O_3$ and $ZrO_2$), metal particles (e.g. Al, Ti, Zn, Fe and Zr), $SiO_2$ or $TiO_2$ base compound oxides or solid solutions [e.g. mullite ($3Al_2O_3 \cdot 2SiO_2$), aluminum titanate ($Al_2O_3 \cdot TiO_2$), zircon ($ZrO_2 \cdot SiO_2$), forsterite ($2MgO \cdot SiO_2$), enstatite ($MgO \cdot SiO_2$), cordierite ($2MgO \cdot 2Al_2O_3 \cdot 5SiO_2$), sapphirine ($4MgO \cdot 5Al_2O_3 \cdot 2SiO_2$), spodumene ($Li_2O \cdot Al_2O_3 \cdot 4SiO_2$), eucriptite ($Li_2O \cdot Al_2O_3 \cdot 2SiO_2$), petalite ($Li_2O \cdot Al_2O_3 \cdot 8SiO_2$), beryl ($3BeO \cdot Al_2O_3 \cdot 6SiO_2$) and celsian ($BaO \cdot Al_2O_3 \cdot SiO_2$)], and metal salts (e.g. barium sulfate, zinc stearate and calcium carbonate).

The magnetic powder to be used in the present invention may be any one of conventionally used magnetic powder. Examples of such magnetic powder are $\gamma$-$Fe_2O_3$ powder, $Fe_3O_4$ powder, cobalt-containing $\gamma$-$Fe_2O_3$ powder, cobalt-containing $Fe_3O_4$ powder, hexagonal system ferrite (e.g. barium ferrite and strontium ferrite), magnetic oxide powder (e.g. $CrO_2$) and magnetic metal or alloy powder (e.g. Fe powder, Co powder and Fe-Ni alloy powder).

In the present invention, any conventionally used binder resin may be used. Specific examples are vinyl chloride/vinyl acetate copolymer, polyvinyl butyral resin, cellulose resin, polyurethane resin, polyester resin, polyisocyanate compound and the like. Further, electron radiation curable resins may be used as the binder resin.

Examples of the organic solvent to be used for the preparation of the suspension of the present invention are ketones (e.g. cyclohexanone, methyl ethyl ketone and methyl isobutyl ketone), esters (e.g. ethyl acetate and butyl acetate), aromatic hydrocarbons (e.g. benzene, toluene and xylene), alcohols (e.g. isopropanol), acid amides (e.g. dimethylformamide), sulfoxides (e.g. dimethylsulfoxide), ethers (e.g. tetrahydrofuran and dioxane) and mixtures thereof.

The suspension comprising the binder resin, the organic solvent and non-magnetic solid additive particles treated with the organosilazane compound may further comprise any conventional additive (e.g. a lubricant, an antistatic agent, etc.).

Carbon black to be used together with the non-magnetic solid additive particles preferably has an average particle size of 0.5 μm or less. Commercially available carbon black such as Black Pearl (manufactured by Cabot) and MA-600 (manufactured by Mitsubishi Chemical) can be used. The content of carbon black is usually from 20 to 70% by weight based on the whole weight of the suspension.

According to the present invention, the back coat layer may be formed by dispersing the non-magnetic solid additive particles treated with the organosilazane compound and carbon black in the binder resin dissolved in the organic solvent to prepare a back coating paint and applying the paint at a thickness of 0.5 to 5 μm on the back surface of the substrate on the front surface of which a magnetic layer has been formed.

The back coat layer may optionally contain a further additive such as a lubricant. The lubricant will reduce the friction coefficient of the back coat layer whereby the durability of the magnetic recording medium is increased, and prevent drop off of the non-magnetic solid additive particles. Insofar as the lubricant is soluble in the organic solvent, one which is solid, semisolid or liquid at room temperature may be used. Examples of the lubricant are aliphatic acids, aliphatic acid esters, liquid paraffin, and the like. The amount of lubricant is not more than 5 parts by weight, preferably from 0.01 to 5 parts by weight per 100 parts by weight of the whole solid content.

The non-aqueous suspension of inorganic solid particles may further contain organic particles which have lipophilic surfaces and can be well dispersed in the non-aqueous solvent without surface treatment.

PREFERRED EMBODIMENTS OF THE INVENTION

The present invention will be illustrated by following Examples, in which part and % are by weight unless otherwise indicated.

EXAMPLE 1

$\alpha$-$Al_2O_3$ (average particle size of 0.8 μm, alumina purity, >99.99%) (30 parts) and, as a dispersant, organosilazane (1 part) of the formula:

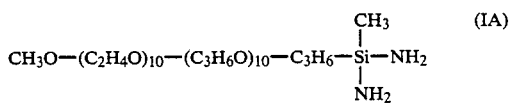

were dispersed in methyl isobutyl ketone (34 parts) and toluene (34 parts) for 50 hours by a ball mill to prepare a non-aqueous suspension for use in the production of magnetic recording medium.

COMPARATIVE EXAMPLE 1

In the same manner as in Example 1 but using lauric acid as a dispersant in place of the organosilazane, a suspension was prepared.

COMPARATIVE EXAMPLE 2

In the same manner as in Example 1 but using a titanate type coupling agent (KR-TTS manufactured by Ajinomoto) acid as a dispersant in place of the organosilazane, a suspension was prepared.

COMPARATIVE EXAMPLE 3

In the same manner as in Example 1 but using an aluminum type coupling agent (AL-M manufactured by Ajinomoto) acid as a dispersant in place of the organosilazane, a suspension was prepared.

COMPARATIVE EXAMPLE 4

In the same manner as in Example 1 but using no dispersant, a suspension was prepared.

For the suspension prepared in each of Example 1 and Comparative Examples 1-4, sedimentation volume and average particle size of $\alpha$-$Al_2O_3$. The results are shown in Table 1.

TABLE 1

| Example No. | Sedimentation Volume (cm³) | Average particle size (μm) |
| --- | --- | --- |
| 1 | 15.9 | 0.92 |
| Comp. 1 | 25.0 | 1.31 |
| Comp. 2 | 25.1 | 1.54 |
| Comp. 3 | 17.1 | 1.10 |
| Comp. 4 | 18.2 | 1.12 |

EXAMPLE 2

A magnetic coating composition comprising following components was coated on a polyester film of 20 μm in thickness having good surface smoothness so that a dry thickness was 6 μm and dried followed by surface treatment to form a magnetic layer on the substrate:

| Component | Parts |
| --- | --- |
| Co-containing acicular magnetic iron oxide powder ($\gamma$-$Fe_2O_3$) | 250 |
| Carbon black | 12 |
| Particulate $\alpha$-iron oxide | 20 |
| Cellulose nitrate | 22 |
| Polyurethane resin | 19 |
| Trifunctional low molecular weight isocyanate compound | 7 |
| Cyclohexanone | 340 |
| Toluene | 340 |
| n-Butyl stearate | 3 |
| Myristic acid | 2 |
| Liquid paraffin | 2 |

Then, on a back surface of the polyester film, a back coat paint comprising following components was applied so that a dry thickness was 3 μm and dried to form a back coat layer. The film having the magnetic layer and the back coat layer was cut in a predetermined width to form a video tape:

| Back coat component | Parts |
| --- | --- |
| $Al_2O_3$ powder (average particle size, 0.5 μm) | 150 |
| Barium sulfate (average particle size, 1.0 μm) | 30 |
| Carbon black (Black Pearl L) (5% of volatile component) | 120 |
| Cellulose nitrate | 100 |
| Polyurethane resin | 70 |
| Trifunctional low molecular weight isocyanate compound | 30 |
| n-Butyl stearate | 3 |
| Myristic acid | 2 |
| Liquid paraffin | 2 |
| Cyclohexanone | 750 |
| Toluene | 750 |
| Organosilazane (IA) used in Example 1 | 10 |

EXAMPLE 3

In the same manner as in Example 2 but using, in place of the organosilazane (IA), organosilazane of the formula:

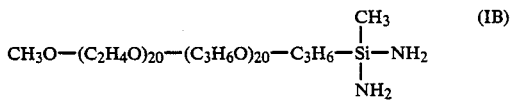

in the back coat paint, a video tape was prepared.

EXAMPLE 4

In the same manner as in Example 2 but using, in place of the organosilazane (IA), organosilazane of the formula:

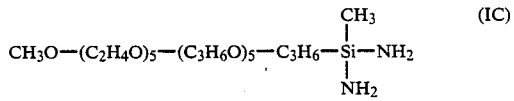

in the back coat paint, a video tape was prepared.

COMPARATIVE EXAMPLE 5

In the same manner as in Example 2 but using no organosilazane in the back coat paint, a video tape was prepared.

Each video tape prepared in Examples 2-4 and Comparative Example 5 was examined for its surface electric resistance, property for preventing nonuniform winding of the tape, abrasion resistance and video characteristics according to following manners:

Surface electric resistance

A pair of quarter round rod electrodes of about 1 cm in radius were horizontally supported in parallel with a distance of 25.4 mm. On the electrodes, a sample of the video tape was placed perpendicular to the electrodes with applying a load of 300 g at each end of the sample. Under such conditions, DC current of 500 V was applied between the electrodes and surface electric resistance was measured.

Nonuniform winding

On a 26 type reel for 90 minutes recording, a 1,410 m of the video tape of 25.4 mm in width was wound. The reel was loaded in a one inch helical VTR (Type C) and the tape was fast forwarded and rewound. Then, the winding appearance of rewound tape was observed.

Abrasion resistance

The video tape of 25.4 mm in width wound on a reel was loaded in a one inch helical VTR (Type C) and repeated traveling of the tape 500 times. Then, the number of the scratches formed on the back surface of video tape was counted.

Video characteristics

Monochromic chroma signal generated by a color video noise measuring apparatus was recorded and reproduced by the wound video tape loaded in a one inch helical VTR (Type C) and an AM noise part was measured to calculate an S/N ratio, a relative value of which to that of the standard video tape was recorded.

The results are shown in Table 2.

TABLE 2

| Example No. | Surface electric resistance ($\Omega$) | Nonuniform winding | Number of scratches | Video characteristics (dB) |
|---|---|---|---|---|
| 2 | $1.3 \times 10^8$ | No | 3 | +1.3 |
| 3 | $2.0 \times 10^8$ | No | 2 | +1.4 |
| 4 | $1.1 \times 10^8$ | No | 5 | +1.2 |
| Comp. 5 | $5.7 \times 10^{13}$ | Yes | 52 | +1.2 |

EXAMPLE 5

The organosilazane (IA) used in Example 1 (3 parts), $Al_2O_3$ (average particle size, 0.8 μm) (100 parts), methyl isobutyl ketone (113 parts) and toluene (113 parts) were mixed and dispersed in a ceramic ball mill for 50 hours to prepare a slurry containing $Al_2O_3$ powder treated with the organosilazane (IA).

The following magnetic paint components were mixed in a ball mill for 100 hours to prepare a magnetic paint:

| Component | Parts |
|---|---|
| Co-containing $\gamma$-$Fe_2O_3$ | 100 |
| Vinyl chloride/vinyl acetate/ vinyl alcohol copolymer (VAGH manufactured by U.C.C.) | 11 |
| Polyurethane resin (T-5201 manufactured by Dainippon Ink Chemical) | 7 |
| Polyisocyanate compound (Colonate L manufactured by Nippon Polyurethane Ind.) | 2 |
| Lauric acid | 1.5 |
| Methyl isobutyl ketone | 75 |
| Toluene | 75 |

Then, the magnetic paint was mixed with 6.6 g of the slurry containing $Al_2O_3$ (2.2 g) to prepare a final magnetic paint. The magnetic paint was coated on a polyester film having a thickness of 12 μm so that a dry thickness was about 4 μm and dried. After planishing the magnetic layer surface, the film was cut to form a magnetic tape having a predetermined width.

EXAMPLE 6

In the same manner as in Example 5 but using the organosilazane (IB) used in Example 3 in place of the organosilazane (IA) for treating $Al_2O_3$, a magnetic tape was prepared.

EXAMPLE 7

In the same manner as in Example 5 but using the organosilazane (IC) used in Example 4 in place of the organosilazane (IA) for treating $Al_2O_3$, a magnetic tape was prepared.

EXAMPLE 8

In the same manner as in Example 5 but using $\alpha$-$Fe_2O_3$ in place of $Al_2O_3$, a magnetic tape was prepared.

COMPARATIVE EXAMPLE 6

In the same manner as in Example 5 but using no organosilazane in the preparation of slurry, a magnetic tape was prepared.

COMPARATIVE EXAMPLE 7

In the same manner as in Example 5 but using no slurry containing $Al_2O_3$ in the preparation of the magnetic paint, a magnetic tape was prepared.

COMPARATIVE EXAMPLE 8

In the same manner as in Example 8 but using no organosilazane for treating $\alpha$-$Fe_2O_3$, a magnetic tape was prepared.

Each magnetic tape prepared in Examples 5–8 and Comparative Examples 6–8 was examined for its squareness (Br/Bs), output at 12.5 Hz and DC noise. After traveling the magnetic tape 100 times in an audio cassette deck, decrease of output was measured and clogging of a magnetic head was observed.

The results are shown in Table 3.

TABLE 3

| Example No | Squareness Br/Bs | Output at 12.5 Hz (dB) | DC noise (dB) | Decrease of output (dB) | Clogging of head |
|---|---|---|---|---|---|
| 5 | 0.80 | 0 | −53.5 | −0.2 | No |
| 6 | 0.79 | 0 | −53.5 | −0.3 | No |
| 7 | 0.81 | +0.2 | −53.5 | −0.2 | No |
| 8 | 0.78 | 0 | −53.0 | −0.4 | No |
| Comp. 6 | 0.77 | −0.4 | −52.0 | −0.8 | Substantially No |
| Comp. 7 | 0.79 | 0 | −53.5 | −0.8 | Yes |
| Comp. 8 | 0.76 | −0.5 | −51.5 | −1.2 | Slightly present |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, a magnetic layer and optionally a back coat layer formed thereon, wherein at least one of the magnetic layer and the back coat layer contains non-magnetic solid particles the surfaces of which are treated with an organosilazane compound having alkyleneoxy units in an amount of from 0.1 to 20 parts by weight of said organosilazane compound per 100 parts by weight of said non-magnetic solid particles.

2. The magnetic recording medium according to claim 1, wherein said organosilazane is a compound having a basic unit of the formula:

$$\begin{array}{c} R' \\ | \\ R-Si-NH_2 \\ | \\ R'' \end{array}$$

wherein R is a group of the formula:

$$R_1(R_2O)_m(CH_2)_n$$

in which $R_1$ is alkoxy or acetoxy having 1 to 6 carbon atoms, $R_2$ is alkylene having 1 to 5 carbon atoms, m is an integer of 1 to 50, n is an integer of 0 to 5, and R' and R'' are the same or different, wherein each may be an alkyl having 1 to 6 carbon atoms or an amino.

3. The magnetic recording medium according to claim 1, wherein said non-magnetic solid particle is at least one single metal oxide selected from the group consisting of $Al_2O_3$, $SiO_2$, $TiO_2$, ZnO, $\alpha$-$Fe_2O_3$ and $ZrO_2$.

4. The magnetic recording medium according to claim 1, wherein said non-magnetic solid particle is at least one compound oxide or solid solution selected from the group consisting of mullite ($3Al_2O_3.2SiO_2$), aluminum titanate ($Al_2O_3.TiO_2$), zircon ($ZrO_2.SiO_2$), forsterite ($2MgO.SiO_2$), enstatite ($MgO.SiO_2$), cordierite ($2MgO.2Al_2O_3.5SiO_2$), sapphirine ($4MgO.5Al_2O_3.2SiO_2$), spodumene ($Li_2O.Al_2O_3.4SiO_2$), eucriptite ($Li_2O.Al_2O_3.2SiO_2$), petalite ($Li_2O.Al_2O_3.8SiO_2$), beryl ($3BeO.Al_2O_3.6SiO_2$) and celsian ($BaO.Al_2O_3.SiO_2$).

5. The magnetic recording medium according to claim 1, wherein said non-magnetic solid particle is at least one metal salt selected from the group consisting of barium sulfate, zinc stearate and calcium carbonate.

6. Non-magnetic solid particles the surfaces of which are treated with an organosilazane compound having a basic unit of the formula:

$$\begin{array}{c} R' \\ | \\ R-Si-NH_2 \\ | \\ R'' \end{array}$$

wherein R is a group of the formula:

$$R_1(R_2O)_m(CH_2)_n$$

in which $R_1$ is alkoxy or acetoxy having 1 to 6 carbon atoms, $R_2$ is alkylene having 1 to 5 carbon atoms, m is an integer of 1 to 50, n is an integer of 0 to 5, and R' and R'' are the same or different, wherein each may be an alkyl having 1 to 6 carbon atoms or an amino.

7. A non-aqueous suspension comprising an organic solvent and non-magnetic solid particles the surfaces of which are treated with an organosilazane compound having a basic unit of the formula:

$$\begin{array}{c} R' \\ | \\ R-Si-NH_2 \\ | \\ R'' \end{array}$$

wherein R is a group of the formula:

$$R_1(R_2O)_m(CH_2)_n$$

in which $R_1$ is alkoxy or acetoxy having 1 to 6 carbon atoms, $R_2$ is alkylene having 1 to 5 carbon atoms, m is an integer of 1 to 50, n is an integer of 0 to 5, and R' and R'' are the same or different, wherein each may be an alkyl having 1 to 6 carbon atoms or an amino.

* * * * *